United States Patent Office
3,825,512
Patented July 23, 1974

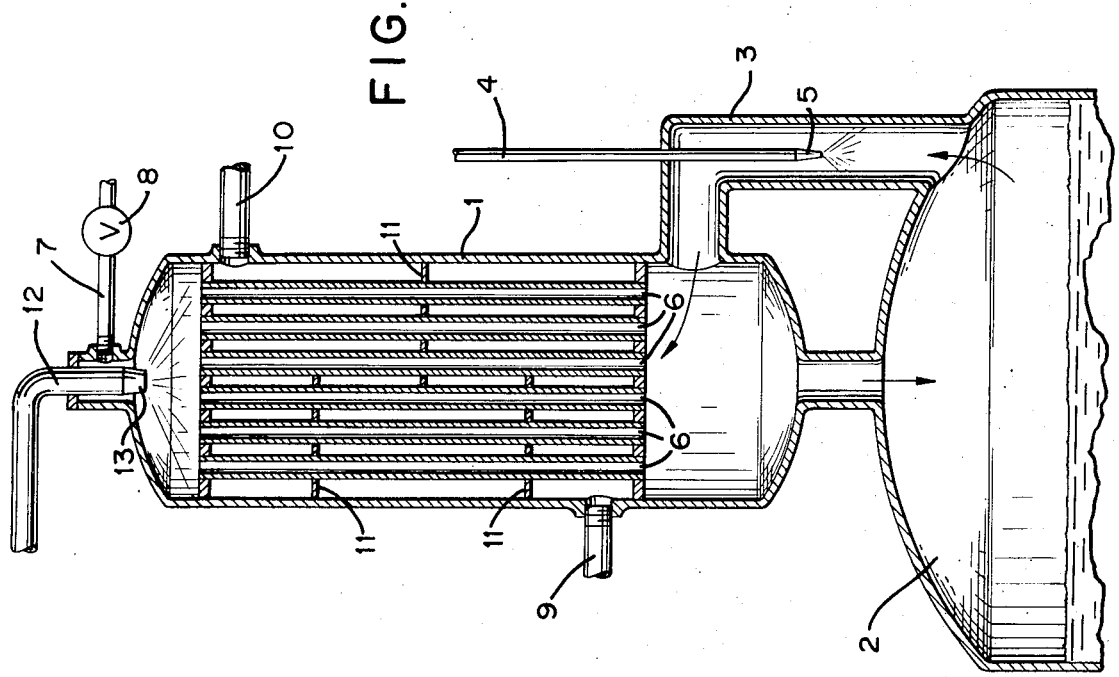
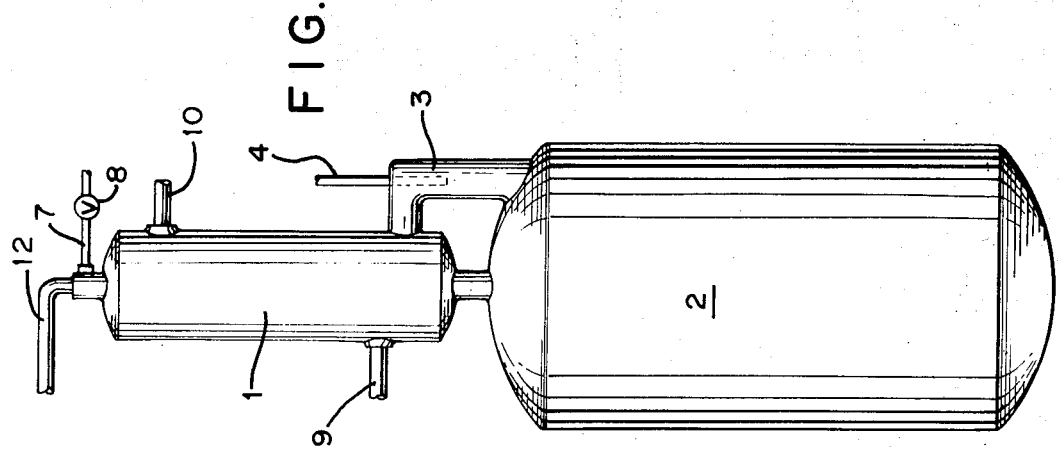

3,825,512
PROCESS FOR POLYMERIZING VINYL CHLORIDE USING A REFLUX CONDENSER
William M. Reiter, Mendham, James E. Cooper, Dover, and Krishnakant K. Sheth, West Caldwell, N.J., assignors to Sumitomo Chemical Company, Ltd., Osaka, Japan, and Universal PVC Resins, Inc., Painesville, Ohio, fractional part interest to each
Continuation-in-part of abandoned application Ser. No. 222,975, Feb. 2, 1972. This application Sept. 11, 1972, Ser. No. 288,176
Int. Cl. C08f 1/11
U.S. Cl. 260—92.8 W   11 Claims

ABSTRACT OF THE DISCLOSURE

This invention provides an improved process for polymerizing vinyl chloride in an aqueous medium using a reflux condenser. The improvement comprises (1) during the condensation period spraying a coating of water on the inner surfaces of the condenser to inhibit the formation thereon of polymerized vinyl chloride particles, and (2) spraying water in the path of and in a direction counter-current to the flow of vinyl chloride vapor as it progresses from the reactor to within the condenser thereby to assist in condensing the vinyl chloride for return to the reactor. The spray may include a defoamer to reduce the tendency of carryover of polymer into the condenser tubes.

---

This application is a continuation-in-part of our previously filed co-pending application U.S. Ser. No. 222,975, filed Feb. 2, 1972, now abandoned.

BACKGROUND OF THE INVENTION

This application relates to polymerizing vinyl chloride and more particularly refers to an improved process for polymerizing vinyl chloride in an aqueous medium using a polymerization reactor and reflux condenser.

Commercially, polymerization of vinyl chloride monomer is carried out in batches in large reaction vessels of capacity of the order of 2,000–10,000 gallons which vessels are surrounded by a water jacket through which either hot or cold water is passed to heat or cool the reaction contents. Polymerization of vinyl chloride is a highly exothermic reaction and generates a great deal of heat. It is essential that the temperature be regulated within narrow limits in order to produce the desired product. This has been accomplished by passing water through the jacket surrounding the reactor to maintain the temperature. It will be evident that the amount of surface area available for cooling the reactor is relatively small compared to the contents of the reactor. A vessel having a volumetric capacity of 5,000 gallons has a cooling surface area of approximately 350 sq. feet. Reaction vessels are generally glass lined, and this combined with the thick outer steel shell makes for poor heat transfer. Normally reactor vessels of this type have a heat transfer rate during polymerization of about 30–50 B.t.u. per hour per sq. foot per degree Fahrenheit.

Reflux condensers were suggested for use in conjunction with reaction vessels many years ago. Reflux condensers can be employed having a much higher surface area, up to twice or more the surface area of the cooling surface area of the reactor. Of at least equal importance is the fact that the heat transfer coefficient of the condenser is appreciably higher than that of the reactor surface, i.e., of the order of 80 to 100 B.t.u. per hour per sq. foot per degree Fahrenheit. In short, the reflux condenser provides means for extracting 2–5 times or more depending on size of condenser as much heat as is feasible from the surface of the reactor. The advantage of extracting a greater amount of heat in a shorter period of time is self-evident in that one can carry out the polymerization in an appreciably shorter interval of time which means greater capacity, lower investment cost for the same capacity, and smaller operating expense for the same capacity.

Despite proposals made in the past to use a reflux condenser in connection with the polymerization of vinyl chloride in an aqueous medium in order to reduce the required polymerization time, most of the commercial processes to produce vinyl chloride polymer do not employ a reflux condenser. In those instances where a reflux condenser is used special provisions are required, such as lowering the batch level in the reactor with resultant reduction in capacity. A primary reason for not using a reflux condenser in polyvinyl chloride production is fouling due to deposit of vinyl chloride polymer on the interior surface of the condenser which requires frequent cleaning and the time, labor, and difficulties involved in cleaning offsets the reduction in polymerization time.

SUMMARY OF THE INVENTION

The present invention relates to a process for polymerizing vinyl chloride in an aqueous medium within a reactor wherein vinyl chloride vapor is released from the reactor, condensed in a condenser, and returned as a liquid to the reactor, and is particularly directed to the feature which comprises contacting the interior surface of the condenser with water, whereby deposit of vinyl chloride polymer on the interior surface is substantially reduced. Another feature is to contact the vinyl chloride vapor as it is withdrawn from the reactor and before it enters the condenser tubes, with a spray of liquid containing a defoamer, thereby reducing the tendency of carryover of polymer into the condenser tubes.

In the preferred method of operation a portion, about 20–45 percent, of the water of the aqueous medium normally charged to the reactor is employed as the water introduced into the condenser during vaporization and condensation of vinyl chloride vapor during the polymerization of the monomer in the reactor.

Because the reflux condenser facilitates a much more rapid polymerization, reactor capacity can in most cases be doubled and economics of manufacturing are much more attractive. Furthermore, the reflux condenser process does not adversely affect the properties of the product or polymerization parameters such as conversion and yield. The need for condenser cleaning and time required for such cleaning are both reduced. Hence, on-stream factor for the condenser is increased and maintenance costs are reduced.

As appreciated by those skilled in the art, when a reflux condenser is employed, the increase in heat-removal capacity provided by the condenser permits an increase in the concentration of initiator over that normally used when a reflux condenser is not employed, the rate of polymerization and heat of reaction being proportional to the square root of the initiator concentration. For example, if the reflux condenser doubles the heat removal capacity of system, the catalyst concentration can then be increased fourfold.

DESCRIPTION OF THE DRAWINGS

FIG. 1 is a view of the exterior of apparatus adapted to the performance of the process of this invention.

FIG. 2 is a cross section of the apparatus shown in FIG. 1.

The apparatus comprises a shell-and-tube reflux condenser mounted on a conventional vinyl chloride polymerization reactor 2. The reactor is usually constructed with a steel outer wall and a glass inner lining and has a jacket surrounding the reactor for cooling or heating purposes. The reactor may vary in capacity from about 2,000–10,000 gallons. The cooling surface provided by the cooling jacket for a reactor of 5,000 gallons constitutes about 350 sq. feet of surface. As will be evident the heat transfer from the outside surface of the reactor to the inside surface of the glass lined reactor is not good, and the heat conductivity ranges generally when clean and during polymerization from about 30–50 B.t.u. per hour per sq. foot per degree Fahrenheit. The condenser is of the tube type and can advantageously be constructed to have a cooling surface area of 1 to 2 times the cooling surface area of the reactor.

The charge to reaction vessel 2 is introduced through an opening at the top not shown in the drawing and comprises the major components, vinyl chloride monomer and water. The monomer may be entirely vinyl chloride or vinyl chloride monomer together with a lesser amount of compounds containing a vinyl group such as, for example vinyl acetate, acrylic acid or the esters of acrylic acid or vinylidene chloride or vinyl bromide, etc. Demineralized water, the other major component of the charging material is added in an amount approximately equal to the amount of vinyl chloride monomer, but this amount may vary from about 30 percent to about 70 percent by weight water based on total charge, dependent on reactants, operating conditions, product, etc.

Normal practice is to leave a vapor space above the liquid level of the contents in the reactor. In accordance with this invention the vapor space need not be increased to minimize fouling caused by carryover of polymer into the reflux condenser. Merely as illustrative, a reactor having a volume of 5800 gallons would be filled with approximately 5,000 gallons liquid leaving a vapor space with a volume of about 800 gallon capacity above the liquid. In the preferred method of operation, some 20–40 percent of the water may be withheld and later introduced through the reflux condenser, preferably as a generally continuous spray, for the purpose of forming a barrier and preventing polymer formation on the inner surface of the tubes of the reflux condenser. This has an additional advantage in that a lower level is used at the initiation of the operation which minimizes the chances of carryover of entrained polymer particles into the reflux condenser.

The polymerization catalysts and additives are well known in the art and will vary dependent upon the type of process employed and product desired. One commonly used process is the emulsion or dispersion polymerization which employs a redox catalyst system such as hydrogen peroxide with sodium formaldehyde sulfoxylate or potassium persulfate with sodium bisulfite and dispersing agents such as the alkyl sulfates and sulfonates. In the other commonly used system known in the art as suspension polymerization the catalyst may be isopropylperoxydicarbonate or caprylyl peroxide. Suspending agents such as polyvinyl alcohol or gelatin are usually employed. Suspension polymerization presents difficulties with respect to the use of a reflux condenser in that the little particles of solid material may be entrained and carried over and the deposition of these solid particles on the walls of the reflux condenser results in rapid clogging up of the condenser tubes. In the emulsion type of operation, entrained latex can also have a strong tendency to gum up the tubes of the reflux condenser. In situ polymerization of vinyl chloride monomer can also occur on the condenser tubes in both types of polymerization.

Cooling water for contact with tubes 6 in condenser 1 may be introduced through pipe 12 entering the top of condenser 1 and terminating in nozzle 13. Other suitable means such as introduction of water at a plurality of spaced points above the tubes may also be employed, but spraying is the preferred method of operation. The demineralized water sprayed from nozzle 13 flows down along the interior surfaces of the tube 6. Ordinarily 1–7 gallons water per minute, depending on size of condenser, is adequate to furnish all the water required for maintaining a coating on the interior surfaces and preventing polymer deposition although more may be used if desired. The effect of this small amount of water is indeed surprising when one considers the relatively large amount of condensate, about 10–100 gallons per minute depending on condenser size and polymerization rate, flowing from the condenser. After passing down through the tubes, the demineralized water falls from the tubes with the vinyl chlorides condensate into reactor 2.

The rate of flow of both the demineralized water and the liquid containing the defoamer is preferably at least as great as the rate of removal of normal volume shrinkage of the reaction mixture in the reactor. The volume of the reaction mixture normally shrinks during the course of the polymerization because of the difference in densities between the monomer and the polymer. The rate of flow can be advantageously greater than the rate of batch shrinkage and is limited only by the volume of the reactor above the liquid level of the reaction mixture.

In certain instances it is advantageous to contact the vinyl chloride vapor as it is withdrawn from the reactor particularly when effecting emulsion polymerization, with a dilute liquid spray defoamer. The liquid containing the defoamer is preferably water, but can be any inert diluent. The defoamer can be any conventional defoamer which does not interfere with the polymerization reaction. Since defoamers are normally employed in connection with vinyl chloride polymerization, such defoamers are well known in the art. The amount of defoamer employed in accordance with this invention can vary over a wide range, depending on the efficiency of the particular defoamer employed and the particular polymerization formulation used. For example, polymerization systems containing high levels of emulsifier with consequent particular tendency to form require a higher level of defoamer addition. The defoamer is added to the reaction mixture at a rate such that the total amount of defoamer added is between 0.001 and 0.2 percent, preferably 0.005 and 0.05 percent, by weight based on the weight of the reaction mixture. The amount of liquid sprayed with the defoamer may be any amount which conveniently provides a spray extending over the cross sectional area of the conduit through which the vinyl chloride vapor flows from the reactor to the condenser.

For convenience, the cooling water flowing through the shell portion of the condenser 1 can be the same as the water leaving the heat-exchange jacket (not shown) of the reactor 2. This water is normally at a temperature of about 25 to 40° C. dependent upon heat removal requirements. Naturally as the water temperature is reduced the heat removal capacity of the system is increased.

The temperature of the sprays is not critical and it is most convenient to use water at ambient temperature. However, using water colder than ambient temperature results in greater heat removal capacity and a tendency for less polymer deposit.

If the vinyl chloride monomer contains noncondensable inert gases, such as nitrogen, dissolved therein, it may be necessary to open valve 8 intermittently during the first hour of polymerization in order to permit the gases to escape.

The temperature and pressure employed are those commonly used in the polymerization of vinyl chloride and will vary somewhat depending upon the product desired. Although polymerization may be carried out at temperatures ranging from about 0° C. to 100° C. the commonly used temperature range varies from about 40 to about 75° C. The pressure may vary widely but generally will be from about 100 to 250 lbs. per sq. inch and preferably ranges from about 100 to 175 lbs. per sq. inch. Usually the pressure unless otherwise regulated will be approximately the autogeneous pressure resulting from vaporization of the monomers in the reaction mixture.

Initially to raise temperature of reaction ingredients to the desired temperature for polymerization a heating medium i.e., hot water, is passed through the jacket surrounding reactor 2 raising the temperature of the reactants in the reactor. Once the reaction is initiated it becomes highly exothermic and generates a great deal of heat. Consequently, a cooling medium i.e., cold water is passed through the jacket and condenser to regulate and maintain the reactants in reactor 2 at a substantially constant polymerization temperature.

As the reaction proceeds, vinyl chloride vapors are generated and rise upwardly from the top of reactor 2 through conduit 3 into condenser 1. Conduit 3 is provided for conveying vinyl chloride vapor from the reactor 2 to the condenser 1 and situated in conduit 3 is pipe 4 terminating in nozzle 5. Liquid containing a defoamer may be sprayed from the nozzle 5 countercurrent to the flow of vinyl chloride vapor. The spray from nozzle 5 prevents entrained foam from rising into condenser 1.

After passing through conduit 3, the vinyl chloride vapor enters the tubes 6 of the reflux condenser 1 wherein it is cooled and condensed. The liquid condensate falls from the tubes to the bottom of the condenser 1, from which it flows into the reactor 2.

A conduit 7, through which gases may be vented, extends from the top of the condenser. A valve 8 controls the flow of gases through the conduit 7.

Cooling water flows through the shell portion of the condenser 1, entering at inlet 9 and exiting at outlet 10. Baffles 11 direct the flow of cooling water through the condenser.

In an alternative method, the conduit 3 need not be employed and instead, a single conduit may be used for both the upward passage of vinyl chloride vapor and the downward return of the vinyl chloride liquid condensate. The conduit connecting the top of the reactor 2 with the condenser 1, should, of course, be sufficiently large to permit ready flow of the vapors of vinyl chloride upwardly countercurrent to the downward flow of the liquid condensate into the body of liquid in reactor 2.

A pipe 12 enters the top of the condenser 1 and terminates in a nozzle 13 above the tube 6. Demineralized water is sprayed from the nozzle 13 and flows down along the interior surfaces of the tubes 6. The introduction of water in contact with the inner surface of the tubes has the effect of forming a barrier or shield which prevents formation and accumulation of polymer on the surface of the condenser tubes. The reason for this inhibiting action is not known particularly when viewed in the light of the small amount of water relative to the quantity of reflux condensate which comes from the condenser tubes. It is believed that preferential wetting of the tubes with water occurs to form a skin which shields the surface of the tube from polymer formation. The internal condenser surface was maintained free of polymer for long periods of time by the use of introduction of water in commercial size equipment.

The following examples illustrate the present invention with Example 1 demonstrating the operation in an emulsion polymerization and Example 2 demonstrating the operation in a suspension polymerization.

EXAMPLE 1

A shell-and-tube reflux condenser was mounted on a conventional 5,000 gallon vinyl chloride polymerization reactor. The condenser contained 235 one-inch tubes having a heat-transfer surface of about 500 sq. feet. The reactor was employed to produce numerous successive batches of vinyl chloride polymer by conventional emulsion polymerization. A typical reaction mixture consisted initially of

| | | |
|---|---|---|
| Demineralized water | gallons | 2,400 |
| Vinyl chloride | pounds | 18,500 |
| Seed latex (30% solids) | do | 33 |
| Sodium formaldehyde sulfoxylate | do | 2.4 |

Polymerization was initiated at about 52° C. by continuously adding to the reaction mixture an aqueous solution of 0.3 weight percent hydrogen peroxide and an aqueous solution of 1.5 weight percent of sodium formaldehyde sulfoxylate. The solutions were added at an hourly rate of 5 gallons and 3.7 gallons, respectively, for the first two hours. Thereafter, the rate of addition of each solution was reduced to about 2.5 gallons per hours. An aqueous solution of 10.5 weight percent sodium lauryl sulfate was also continuously added at a rate of from 8 to 11 gallons per hour until a total of about 70 gallons had been added.

After polymeriztaion had been initiated, the temperature of the cooling water in the heat-exchange jacket surrounding the reactor was adjusted to between 35 and 40° C. In order to maintain a polymerization temperature of about 52° C. The cooling water leaving the jacket was fed to the shell portion of the reflux condenser. The condenser was vented about three times during the first hour of polymerization to permit inert gases to escape. Each venting was carried out for about 5 minutes and the interval between each venting was about 15 minutes. Condensation of vinyl chloride in the reflux condenser began about an hour after polymerization had been initiated.

About three hours after polymerization had been initiated, and while condensation is occurring demineralized water was sprayed over the condenser tubes and water containing a defoamer dissolved therein was sprayed counter-current to the flow of vinyl chloride vapor entering the condenser. The demineralized water was sprayed at a rate of about 3 gallons per minute; and the defoamer solution was sprayed at a rate of about 4 gallons per hour. The defoamer solution was prepared by dissolving one gallon of a commercially available active silica derivative defoamer into 25 gallons of demineralized water.

Between 6 and 7 hours after polymerization had been initiated, the pressure in the reaction vessel decreased by 5 to 10 p.s.i., indicating that the polymerization was approaching the desired degree of conversion. At this point addition of the hydrogen peroxide and sodium formaldehyde sulfoxylate solutions was terminated. About 30 minutes later, the system was vented and all spraying was stopped. The degree of conversion for each batch was about 85 to 90 percent.

The average polymerization time when the reflux condenser was used was 6.6 hours. In comparison, the average polymerization time for the same degree of conversion when the reflux condenser was not used was 16.6 hours. This substantial reduction in polymerization time is attributable to the increased heat-removal capacity provided by the reflux condenser. The quality of the product obtained using the reflux condenser was at least as good as the product obtained without using the reflux condenser.

Due to the spraying of the tubes and the entering vinyl chloride stream, about 40 batches of vinyl chloride polymer could be produced before cleaning of the tubes in the condenser was required. In comparison, when one of the spraying steps is omitted, the tubes must be cleaned after 10 or fewer batches.

This example illustrates the benefits of carrying out the spraying steps of this invention during at least a major portion of the polymerization. This portion is preferably the latter portion of the polymerization, but greater reduction of polymer deposit is achieved when the spraying steps are carried out continuously during the entire polymerization, especially when an emulsifier is added to the initial polymerization mixture.

EXAMPLE 2

The same apparatus as used in Example 1 comprising a shell-and-tube reflux condenser mounted on a 5,000 gallon polymerization reactor was employed for carrying out several conventional suspension polymerization operations.

A typical reaction mixture consisted initially of

| | |
|---|---|
| Demineralized water _____ gallons__ | 2,050 |
| Vinyl chloride _____ pounds__ | 16,000 |
| Suspending agent Polyvinyl alcohol _____ do____ | 10 |
| Additive buffer—Disodium phosphate ___ do____ | 4 |
| Defoamer "colloid 581-B" Active silica derivative defoamer _____ gallon__ | 1 |
| Catalyst—isopropyl peroxydicarbonate pounds__ | 6.25 |

The demineralized water is first introduced into the reactor at a temperature of about 75–80° C. along with the suspending agent, buffer and defoamer. The reactor is then closed and a vacuum is drawn to remove residual oxygen and noncondensables. This is followed by the introduction of cold vinyl chloride monomer. At this point the temperature of the reaction mixture is near the desired polymerization temperature of 59° C. and the catalyst is injected as a solution in solvent.

Immediately after the catalyst charge, the spraying of water onto the condenser tubes is initiated at a rate of about 3 g.p.m. and is maintained during the condensation period, preferably until polymerization end. Concurrent with the start of water spray the jackt water temperature is automatically reduced as required to remove the exothermic heat of polymerization and to maintain the reaction mixture at a temperature of 59° C.

By 15–30 minutes after polymerization had been initiated, the rate of exotherm from the reactor and condenser exceeded that which could ordinarily have been removed by the reactor jacket alone. Yet at this point only a 35–40° C. jacket water temperature was required to maintain a constant polymerization temperature.

About 3 to 3 and ½ hours after polymerization was initiated, a sharp reduction in reactor pressure occurred indicating the nearly complete conversion of the monomer to polyvinyl chloride. The polymerization was then terminated by the venting of unreacted monomer from the reactor.

By the end of polymerization about 900 gallons of demineralized water spray had been introduced through the condenser. Most of this water would ordinarily have been charged initially to the reactor. No continuous spray of defoamer was required for the suspension polymerization.

Eleven batches were produced in the above manner. Polymerization time averaged about 3.5 hours whereas polymerization time when the reflux condenser was not used could not be reduced below eight hours.

The condenser tubes were inspected after each batch and after the total eleven batches were produced there existed no significant deposition on the condenser tubes. In comparison a similar operation was conducted without the spraying of water onto the condenser tubes and the overall heat transfer coefficient of the condenser reduced steadily throughout a single polymerization from 100 to 10 B.t.u. per hour per sq. foot per degree Fahrenheit due to deposition of polymer particles on the tube surfaces.

We claim:

1. In a process for polymerizing vinyl chloride in an aqueous medium within a reactor wherein vinyl chloride vapor is withdrawn from the reactor, condensed in a condenser, and returned as a liquid to the reactor, the improvement which comprises spraying a coating of water on the interior surfaces of the condenser during the condensation period, whereby deposit of vinyl chloride polymer on such interior surfaces is substantially reduced.

2. A process as claimed in claim 1 wherein the water is introduced into the condenser in the form of a spray.

3. A process as claimed in claim 1 wherein the water is introduced into the condenser at the rate of about 1 to 7 gallons water per minute.

4. A process as claimed in Claim 1 wherein a portion of the water component of the aqueous medium, rather than being introduced into the reator before said process is initiated, is introduced into the condenser as a generally continuous stream during vaporization and condensation of vinyl chloride vapor.

5. A process as claimed in Claim 4 wherein 20–45% of the total aqueous medium is introduced into the condenser as a water spray during the polymerization process.

6. A process as claimed in Claim 1 wherein water is sprayed in contact with and counter-current to the flow of the vinyl chloride vapor as said vapor flows from said reactor into said condenser.

7. A process as claimed in claim 6 wherein the water introduced in contact with the vinyl chloride vapor contains a defoamer.

8. In a process for polymerizing vinyl chloride in an aqueous medium containing a suspension of solid vinyl chloride polymer within a reactor, and wherein vinyl chloride vapor is withdrawn from the reactor, condensed in a condenser, and returned as liquid to the reactor, the improvement which comprises generally continuously coating the interior surface of the condenser with water during a major portion of the polymerization period, whereby deposit of vinyl chloride polymer on such interior surface is substantially reduced.

9. In a process for polymerizing vinyl chloride in an aqueous medium containing a dispersing agent to produce a latex or dispersion of very fine solid polymer particles within a reactor, wherein vinyl chloride vapor is withdrawn from the reactor condensed in a condenser by exposure to the interior walls thereof, and returned as a liquid to the reactor, the improvement which comprises continuously directing a coating of water on such interior walls of the condenser, whereby deposit of vinyl chloride polymer on such walls is substantially reduced.

10. A process as claimed in claim 1 wherein the vinyl chloride vapor is released through an opening in the top of the reactor and the liquid condensate from the condenser returns to the reactor through the same opening.

11. A process as claimed in claim 1 wherein the cooling surface area of the condenser is between 1 to 2 times the area of the cooling surface of the reactor.

References Cited

UNITED STATES PATENTS

| | | | |
|---|---|---|---|
| 3,515,709 | 6/1970 | Nelson et al. _____ | 260—92.8 |
| 3,669,946 | 6/1972 | Koyanagi et al. ____ | 260—87.5 R |
| 3,578,649 | 5/1971 | Badquerhanian et al __ | 260—92.8 |

FOREIGN PATENTS 4,839,929    6/1952    Canada.

JOSEPH L. SCHOFER, Primary Examiner

J. KIGHT, Assistant Examiner

U.S. Cl. X.R.

260—86.3, 87.1, 87.5